APPARATUS AND SYSTEM FOR REMOVAL OF LATEX FROM WASTE WATER
Filed Dec. 28, 1970 3 Sheets-Sheet 1
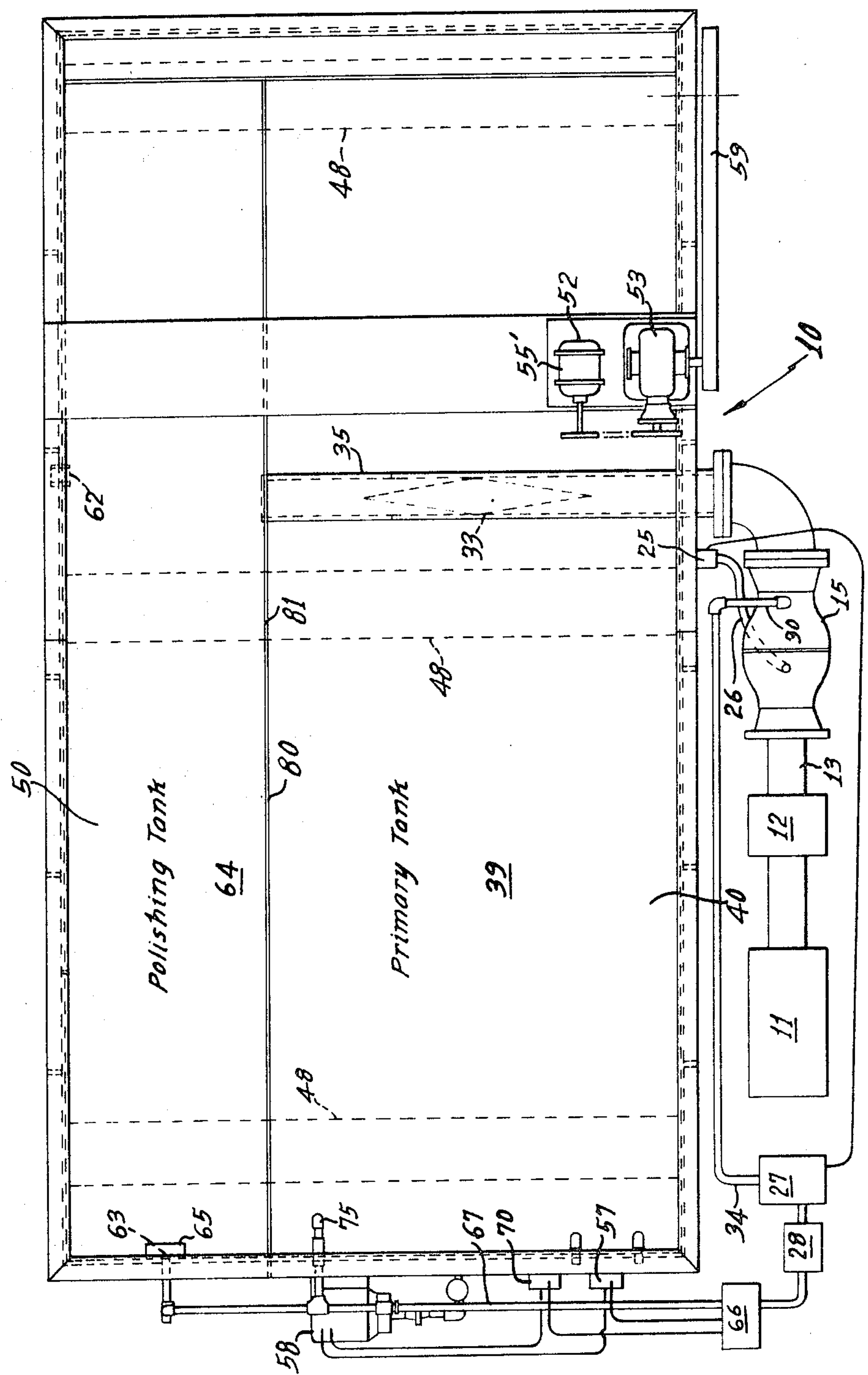
INVENTOR
Winfield H. Scott, Jr.
BY
George H. Baldwin
ATTORNEY April 10, 1973 W. H. SCOTT, JR 3,726,794
APPARATUS AND SYSTEM FOR REMOVAL OF LATEX FROM WASTE WATER
Filed Dec. 28, 1970 3 Sheets-Sheet 2
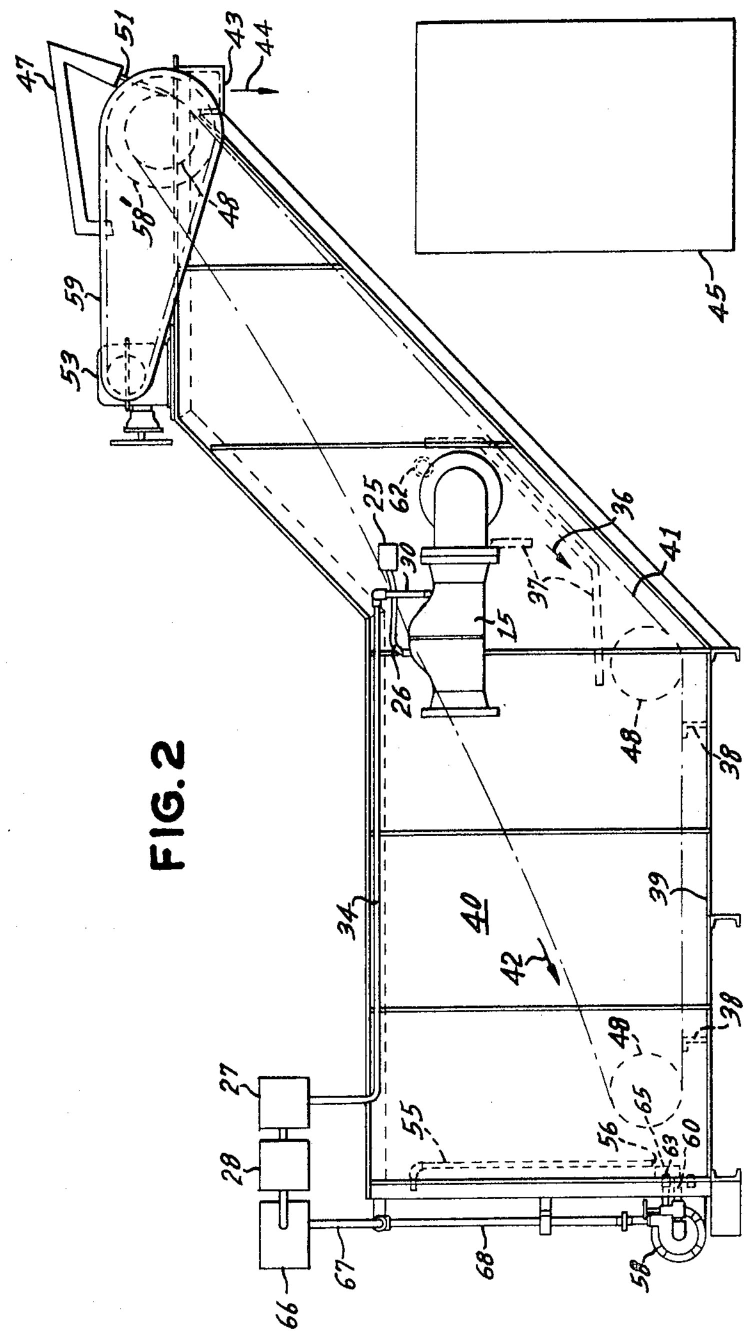
INVENTOR
Winfield H. Scott, Jr.
BY
George H. Baldwin
ATTORNEY APPARATUS AND SYSTEM FOR REMOVAL OF LATEX FROM WASTE WATER
Filed Dec. 28, 1970 
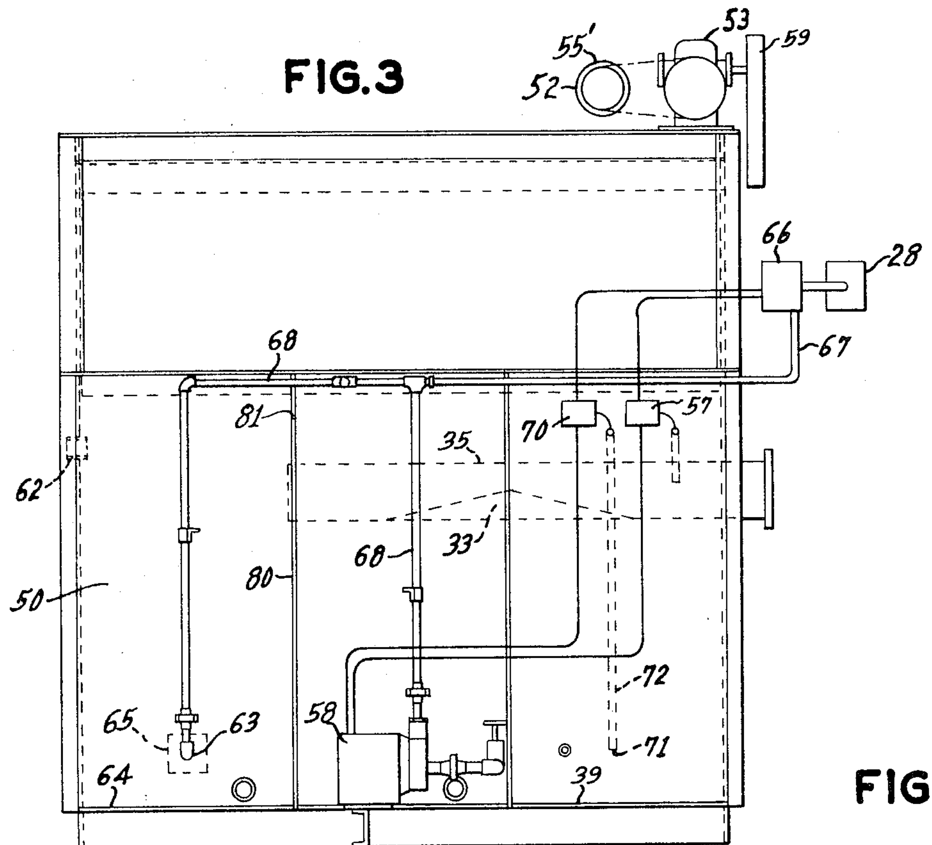
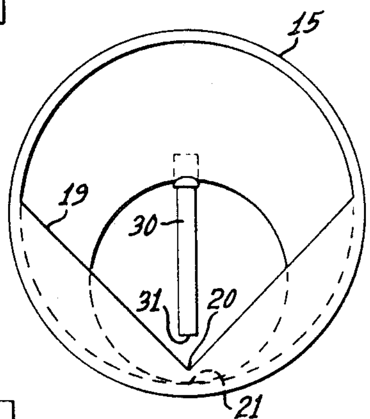
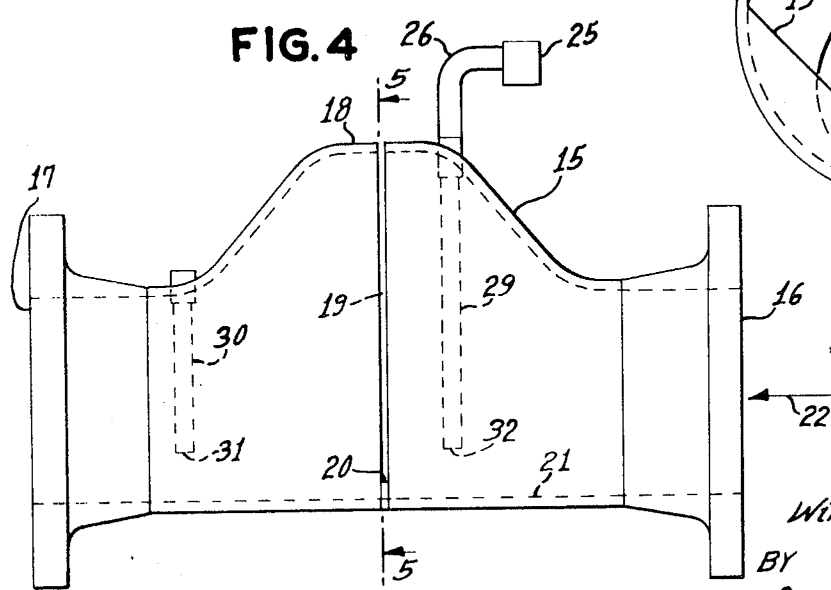
INVENTOR
Winfield H. Scott, Jr.
BY
George H. Baldwin
ATTORNEY United States Patent Office 3,726,794
Patented Apr. 10, 1973

3,726,794

APPARATUS AND SYSTEM FOR REMOVAL OF LATEX FROM WASTE WATER

Winfield H. Scott, Jr., Jacksonville, Fla., assignor to Clarkson Industries, Inc., New York, N.Y.

Filed Dec. 28, 1970, Ser. No. 102,015
Int. Cl. B01d *21/08, 21/24*
U.S. Cl. 210—104 20 Claims

ABSTRACT OF THE DISCLOSURE

The apparatus and system sense the flow of latex laden waste water above a predetermined minimum, mixes and treats same with chemicals in a compartment prior to storage of a batch of latex laden waste water and chemicals in a primary settling tank. The waste water is pumped from the primary tank upon filling of same above a predetermined level and chemicals are fed thereinto prior to being supplied to a polishing tank for final clarification and thereafter discharged into the sewer.

BACKGROUND OF THE INVENTION

Field of the invention

This invention relates to apparatus and a system for removal of sticky or gummy materials from waste water by the addition of chemicals thereto for settling same, and more particularly to an improved apparatus and a system for removal of latex from latex laden waste water.

Description of the prior art

Apparatus and systems employing settling tanks for the removal of latex from latex laden waste water have been generally known, the prior art failing to teach or suggest an apparatus and system which achieves the results or perform the functions of the invention herein described and claimed.

SUMMARY OF THE INVENTION

When latex is used in a rug finishing process for attaching burlap or foam rubber backing to rugs, for example, the latex mixing tanks, dip troughs, pipe line, etc., must be frequently cleaned and washed out with water resulting in large amounts of waste water with varying quantities of latex and latex foam therein which heretofore have been dumped into the sewer or river prior to or after some batch type of settling techniques used in the industry.

An aspect of the invention relates to an apparatus and a system for removing latex from latex laden waste water including a mixing compartment into which latex laden waste water is supplied and control means connected to the compartment for sensing the rate of flow of the latex laden waste water therethrough. Pump means activated by the control means upon sensing the rate of flow above a predetermined rate supplies treating chemicals from a source to the compartment upon activation of the pump means whereby the chemicals are mixed with and treat the latex laden waste water in the compartment. A settling tank means receives the chemicals and latex laden waste water from the compartment and settles out the major portion of the latex sludge therein, the settling tank including means for removing the settled latex sludge therefrom.

Other aspects relate to other features of the system wherein the means for sensing the rate of flow includes an air bubble control having a conduit extending into the compartment, and a weir plate located in the compartment downstream of the conduit. The compartment includes an opening located downstream of the weir plate through which the chemicals are discharged into the compartment through a pipe having its end submerged in the latex laden waste water passing through the compartment.

Also, a polishing tank means receives latex laden waste water from the settling tank means supplied by another pump means which is activated and deactivated by another control means responding respectively to predetermined high and low fluid levels in the settling tank means. A proportioning pump means is connected between the other pump means and the polishing tank means for supplying chemicals from the source into the latex laden waste water to further treat same, said other control means controlling the activation and deactivation of the proportioning pump means substantially simultaneously with the activation and deactivation of the other pump means. The polishing tank includes another means for removing settled sludge therefrom and includes an endless conveyor located therein, such conveyor being commonly driven with the endless conveyor in the settling tank means which constitutes the means for removing the settled latex sludge therefrom. A scraping means is associated with each conveyor adjacent the discharge portion thereof for wiping the sludge from the conveyor flights as they come into contact with the scraping means.

A general object of the invention is to provide an improved apparatus and system for removing latex and latex foam from latex laden waste water before discharge thereof into the sewer.

A particular object is the provision of an improved compartment in which the flow of the latex laden waste water is sensed and into which chemicals are fed and mixed therein prior to passage into the primary settling tank.

A specific object is to provide a system in which the waste water is removed from the primary settling tank upon filling of same and chemicals added thereto prior to pumping same into a polishing tank to further settle out the latex entrained in the waste water.

Other objects are to provide an improved system which is readily and inexpensively manufactured, easily installed in existing latex using plants, and durable and efficient in operation and use.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a plan view of the apparatus and system for removal of latex from latex laden waste water in accord with the invention, the cover being removed for clarity;

FIG. 2 is a side elevational view thereof;

FIG. 3 is a front elevational view thereof;

FIG. 4 is an enlarged side elevational view of the flow sensitizer compartment of the apparatus of FIG. 1; and FIG. 5 is a cross-sectional view taken along line 5—5 of FIG. 4.

DESCRIPTION OF THE PREFERRED EMBODIMENT

Referring now more particularly to the drawings, the system for removing latex and latex foam entrained within waste water is designated at 10 and includes a source of waste water 11 containing latex and latex foam which may vary from about 50 p.p.m. to 5000 p.p.m., depending on the amount of latex remaining in the mixing tanks, etc., to be washed and cleaned out with the waste water. The latex laden waste water is supplied through appropriate gates 12 and piping 13 by gravity feed to a sensitizing compartment 15 in accord with the invention, such compartment being clearly shown in FIGS. 4 and 5.

The compartment 15 includes an inlet end 16 and an outlet end 17 and an enlarged central portion 18 with a weir plate 19 mounting medially between ends 16 and 17, weir plate 19 having a 90° notch 20 therein which is spaced upwardly from the bottom 21 of the compartment a predetermined distance. Thus, the waste water flowing in the direction of arrow 22 will pass through the notch 20 and turbulence of the waste water will occur adjacent thereto and downstream therefrom. A bubble control means 25 including a sensitive air pressure switch and other electrical components (not shown but well known in the art) is connected by air tube 26 to the elongated conduit 29 extending into compartment 15 laterally of the flow of waste water and terminating in an open end 32 spaced above notch 20 a predetermined distance, so that the air bubble control 25 will sense a flow of waste water corresponding to about 3 g.p.m. whereupon the turbine pump 27 will become activated to pump chemicals from a source 28 (as shown in FIG. 1) of chemicals, such as a water solution of aluminum sulfate, or other clarifying or flocculating chemicals, into and through pipe 30 extending into compartment 15 laterally of the waste water flow and spacedly downstream of weir plate 19. When the flow of waste water is above 3 g.p.m., the conduit end 32 is below the level of the waste water and the end 31 of chemical feed pipe 30 is preferably below the level of the waste water to entrain and become mixed with the latex laden waste water prior to discharge through outlet end 17 and into the primary settling tank inlet 33, the mixing being enhanced by the turbulence of the waste water particularly as it flows pass conduit 29, weir plate 19 and feed pipe 30.

Since there may be some small leaks of waste water which may flow through the compartment 15, it is desirable to not feed in chemicals to trickles of waste water which pass therethrough but only to inject chemicals when large amounts of such waste water is being passed therethrough. This has been accomplished by appropriate positioning of the conduit end with respect to the weir plate 19 and notch 20, as well as the employment of a suitable air pressure sensitive switch in control 25.

When the waste water in the end 32 of conduit 29 drops sufficiently due to decreased flow of the waste water corresponding to less than about 3 g.p.m., control 25 deactivates turbine pump 27 and chemicals through line 34 and into pipe 30 ceases.

The waste water, containing latex and the chemicals supplied thereto, is fed through the inlet 33 of horizontal pipe 35 and flows from such inlet in the direction of arrow 36 onto a baffle 37 located therebeneath so that the incoming waste water will not wash the sludge that is being removed by the conveyor bars or flights 38 as they drag the bottom 39 of the primary settling tank 40, particularly those that are beneath the inlet 33 as the conveyor 41 moves in the direction of arrow 42 to discharge the sludge out the outlet 43, in the direction of arrow 44, into a sludge receiving bin 45. A cantilever scraper mechanism 47 is mounted along and adjacent the upper conveyor roll 48, the elongated scraper bar 51 extends substantially the width of the primary tank 40 with another scraper mechanism (not shown) cooperating with the conveyor in the polishing tank 50. The scraper bar 51 engages the elongated bars 38 of conveyor 41 in the primary tank 40 and scrapes off the sludge thereon which falls into bin 45. The conveyor in the polishing tank 50 is not shown but is identical to conveyor 41 except that the width thereof is decreased to about one-half to be accommodated within polishing tank 50.

The conveyors, including conveyor 41, are driven at a slow rate by a common driving motor means 55' including a motor 52 driving a gear reduction mechanism 53 which in turn drives the pulley 58' attached to roll 48 by belt 59.

The primary tank 40 is designed to receive and store sufficient waste water from a cleaning operation in a batch type of cleaning of the latex mixing drums, etc., possibly every two hours if necessary. For example, tank 40 may store approximately 900 gallons while the polishing tank 50 may store about 450 gallons. Thus, about one cleaning operation may be sufficient to approximately fill tank 40. When the next cleaning waste water fills the tank 40, sufficiently to the predetermined height in pipe 55, having an end 56 spaced above the bottom 39 of tank 40, the air pressure sensitive control 57 activates transfer pump 58 communicating between tank 40 and tank 50 by suitable piping 68 and connections well known in the art. The infeed 60 for the pump 58 is located spacedly above bottom 39 thereby to inhibit the ingress of sludge therethrough. Since the relatively clean water from the polishing tank 50 will flow out the top portion of the tank through outlet 62 by gravity into the sewer, the discharge from the pump and inlet 63 to the polishing tank 50 is located spacedly upwardly from the bottom 64 of tank 50 whereby the ingress of latex and chemical laden water will tend to remain adjacent the bottom 64 of tank 50 whereby the ingress of latex and chemical laden water will tend to remain adjacent the bottom 64 of tank 50 with the cleaner water being discharged out opening 62. Also, an L-shaped baffle 65 is provided in tank 50 in line with inlet 63 so that the pumped waste water will be directed generally downward to minimize turbulence within tank 50.

Control 57 activates proportioning pump 66 which feeds chemicals from source 28 into and through pipe 67 into piping 68 which is feeding the partially cleaned latex laden waste water from tank 40 to tank 50. Since the pump 58 is rated at 10 g.p.m., it would take approximately one and one-half hours to empty tank 40. Thus, while additional waste water is being fed into tank 40, tank 40 will be pumped down until the fluid level therein drops sufficiently for the air pressure sensitive control 70 to open a switch therein (not shown) which deactivates both the proportioning pump 66 and pump 58. While the liquid level in tank 40 is above the lower end 71 of pipe 72, the control 70 is in a permissive state with the switch therein closed so that. when the control 57 is activated, pumps 66 and 58 operate, but when control 70 becomes deactivated due to the sufficient drop in the liquid level in tank 40, pumps 58 and 66 become deactivated.

Piping 68 is provided with an air vent 75 extending into tank 40, such air vent including a normally open check valve (not shown) which closes under liquid pressure in line 68 from pump 58. When pump 58 is deactivated, the air vent 75 opens to prevent siphoning of the latex laden waste water back from tank 50 through the pump 58 and into tank 40, although the waste water in piping 68 between the air vent 75 and pump 58 will siphon back through the pump 58 until the liquid levels in piping 68 and tank 40 are equal.

In the common partition 80 between tanks 40 and 50, a notch 81 is provided with the bottom of the notch 81 being spaced above the lower end 56 of pipe 55 whereby any surge of latex laden waste water which may tend to overflow tank 40 will pass through the notch and into polishing tank 50 with the water therein being discharged through outlet 62. The bottom of the notch 81 is also located above the outlet 62 to prevent water from flowing from tank 50 to tank 40 through the notch 81.

It may be desirable to eliminate the proportioning pump 66 and turbine pump 27 and replace same with a single pump and two solenoid valves respectively in lines 67 and 34 which are activated and deactivated by air bubble controls 57, 70 and 25. Normally, the primary settling tank 40 would become filled with latex laden waste water with the chemicals added before it would be necessary to empty the primary tank 40 into the polishing tank 50. Thus, the solenoid valve in line 34 would be activated to open same upon control by air bubble control 25 indicating sufficient waste water flow through flow sensitizer compartment 15 whereby chemicals are added to the compartment 15 with the major portion of the sludge being settled in primary tank 40. Since the flow through compartment 15 ceases or will soon cease, the air bubble control 57 activates solenoid valve in line 67 to supply chemicals to the waste water being pumped by pump 58 from primary settling tank 40 to the polishing tank 50 and such valve in line 67 would be deactivated by control 70, as previously described.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a system for removal of latex from latex laden waste water comprising a mixing compartment into which latex laden waste water is supplied at varying rates of flow, control means connected to said compartment for sensing the rate of flow of the latex laden waste water therethrough, said control means including means within said compartment for establishing a water level related to the rates of flow of the latex laden waste water therethrough, said control means further including means responsive to the level of the latex laden waste water for sensing the rate of flow above a predetermined rate, a source of chemicals for treating the latex laden waste water, pump means activated by said responsive means upon sensing the rate of flow above said predetermined rate and remaining deactivated at lesser rates of flow below said predetermined rate, said pump means being fluidly communicating between said source and said compartment for supplying chemicals from said source to said compartment upon activation of said pump means whereby the chemicals are mixed with and treat the latex laden waste water in said compartment, settling tank means connected to said compartment for receiving the chemicals and latex laden waste water from said compartment and for settling out the latex as a sludge therein, and means for removing the settled latex sludge from said settling tank.

2. In the system as defined in claim 1 wherein said responsive means includes an air bubble control having a conduit extending into said compartment and wherein said means within said compartment includes a weir plate located downstream of said conduit.

3. In the system as defined in claim 2 wherein said compartment includes an opening located downstream of said weir plate through which the chemicals are discharged into said compartment.

4. In the system as defined in claim 2 wherein said compartment includes an opening located downstream of said weir plate, an elongated pipe extending through said opening and terminating in a discharge outlet above the inner surface of said compartment, said discharge outlet being located closely adjacent to and normally beneath the level of the latex laden waste water flowing through said compartment.

5. In the system as defined in claim 1 further comprising a polishing tank means for receiving latex laden waste water from said settling tank means, another pump means for fluidly communicating between said settling tank means and said polishing tank means for supplying the latex laden waste water from said settling tank means to said polishing tank means, means for activating and deactivating said other pump means corresponding respectively to predetermined high and low fluid levels in said settling tank means.

6. In the system as defined in claim 1 further comprising a polishing tank means for receiving the latex laden waste water from said settling tank means, another pump means for fluidly communicating between said settling tank means and said polishing tank means for supplying the latex laden waste water from said settling tank means to said polishing tank means, another control means for sensing the height of the fluid level in said settling tank means to activate said other pump means when the height of the fluid within said settling tank means is at the level of the inlet of said settling tank means through which the chemicals and latex waste water from said compartment enter, said other control means deactivating said other pump means when the height of the fluid within said settling tank drops below a predetermined low level, a proportioning pump means connected between said other pump means and said polishing tank means for supplying chemicals from said source into the latex laden waste water to further treat same, said other control means controlling the activation and deactivation of said proportioning pump means substantially simultaneously with the activation and deactivation of said other pump means, and another means for removing settled sludge from said polishing tank.

7. In the system as defined in claim 6 wherein said other control means includes a pair of air bubble controls each having an elongated pipe extending into said settling tank means, one said pipe having an end terminating at a level generally at the level of said inlet, the other of said pipe having an end terminating adjacent the bottom of said settling tank means, said air bubble control including said one pipe being operative when the fluid level is above said end of said pipe to activate said other pump and said proportioning pump, said air bubble control including said other pipe being operative to deactivate said other pump and said proportioning pump when the fluid level is below said end of said other pipe.

8. In the system as defined in claim 6 wherein said polishing tank includes a clean water outlet adjacent the upper extremity of said polishing tank whereby clean water therein may be discharged by gravity when the fluid level rises to said outlet.

9. In the system as defined in claim 6 wherein said means for removing sludge in said settling tank and said other means for removing sludge in said polishing tank respectively include an endless conveyor located therein, and a common driving means for each of said conveyors.

10. In the system as defined in claim 9 further comprising scraping means associated with each conveyor adjacent the discharge portion thereof for wiping the sludge from said conveyors.

11. An apparatus for use in a system for removal of latex from latex laden waste water comprising a mixing compartment into which latex laden waste water is supplied, control means connected to said compartment for sensing the rate of flow of the latex laden waste water therethrough, said control means including means within said compartment for establishing a water level related to the rates of flow of the latex laden waste water therethrough, said control means further including means responsive to the level of the latex laden waste water for sensing the rate of flow above a predetermined rate pump means activated by said responsive means upon sensing the rate of flow above said predetermined rate, said pump means being operative to supply treating chemicals to said compartment upon activation of said pump means whereby the chemicals are mixed with and treat the latex laden waste water in said compartment, settling tank means connected to said compartment for receiving the chemicals and latex laden waste water from said compartment and for settling out the latex as a sludge therein, and means for removing the settled latex sludge from said settling tank.

12. The apparatus as defined in claim 11 wherein said responsive means includes an air bubble control having a conduit extending into said compartment, and wherein said means within said compartment includes a weir plate located downstream of said conduit.

13. The apparatus as defined in claim 12 wherein said compartment includes an opening located downstream of said weir plate through which the chemicals are discharged into said compartment.

14. The apparatus as defined in claim 12 wherein said compartment includes an opening located downstream of said weir plate, an elongated pipe extending through said opening and terminating in a discharge outlet above the bottom inner surface of said compartment, said discharge outlet being located closely adjacent to and normally beneath the level of the latex laden waste water flowing through said compartment.

15. The apparatus as defined in claim 11 further comprising a polishing tank means for receiving latex laden waste water from said settling tank means, another pump means for fluidly communicating between said settling tank means and said polishing tank means for supplying the latex laden waste water from said settling tank means to said polishing tank means, means for activating and deactivating said other pump means corresponding respectively to predetermined high and low fluid levels in said settling tank means.

16. The apparatus as defined in claim 15 further comprising another means for removing settled sludge from said polishing tank.

17. The apparatus as defined in claim 16 wherein said means for removing sludge in said settling tank and said other means for removing sludge in said polishing tank respectively include an endless conveyor located therein, and a common driving means for each of said conveyors.

18. The apparatus as defined in claim 17 further comprising scraping means associated with each conveyor adjacent the discharge portion thereof for wiping the sludge from said conveyors.

19. The apparatus as defined in claim 11 further comprising a polishing tank means for receiving the latex laden waste water from said settling tank means, another pump means for fluidly communicating between said settling tank means and said polishing tank means for supplying the latex laden waste water from said settling tank means to said polishing tank means, another control means for sensing the height of the fluid level in said settling tank means to activate said other pump means when the height of the fluid within said settling tank means is at the level of the inlet of said settling tank means through which the chemicals and latex waste water from said compartment enter, said other control means deactivating said other pump means when the height of the fluid within said settling tank drops below a predetermined low level, a proportioning pump means connected between said other pump means and said polishing tank means for supplying chemicals into the latex laden waste water to further treat same, said other control means controlling the activation and deactivation of said proportioning pump means substantially simultaneously with the activation and deactivation of said other pump means, and another means for removing settled sludge from said polishing tank.

20. The apparatus as defined in claim 19 wherein said other control means includes a pair of air bubble controls each having an elongated pipe extending into said settling tank means, one said pipe having an end terminating at a level generally at the level of said inlet, the other of said pipe having an end terminating adjacently above the bottom of said settling tank means, said air bubble control including said one pipe being operative when the fluid level is above said end of said pipe to activate said other pump and said proportioning pump, said air bubble control including said other pipe being operative to deactivate said other pump and said proportioning pump when the fluid level is below said end of said other pipe.

References Cited

UNITED STATES PATENTS

| | | | |
|---|---|---|---|
| 646,108 | 3/1900 | Kennicott | 210—101 |
| 417,046 | 12/1889 | Kendrick | 210—101 |
| 3,563,382 | 2/1971 | Regent | 210—104 |
| 3,194,399 | 7/1965 | Harms | 210—104 |
| 3,032,545 | 5/1962 | Renberg | 210—DIG. 15 |

JOHN ADEE, Primary Examiner

U.S. Cl. X.R.

210—202, 206, 208, 526